United States Patent [19]

Acker

[11] Patent Number: 4,491,711
[45] Date of Patent: Jan. 1, 1985

[54] ELECTRO MECHANICAL TUBING SEALER

[75] Inventor: Loren C. Acker, Tucson, Ariz.

[73] Assignee: Engineering & Research Associates, Inc., Tucson, Ariz.

[21] Appl. No.: 449,639

[22] Filed: Dec. 14, 1982

Related U.S. Application Data

[60] Division of Ser. No. 334,749, Dec. 28, 1981, Pat. No. 4,390,832, which is a continuation of Ser. No. 122,293, Feb. 19, 1980, abandoned.

[51] Int. Cl.³ .............................................. H05B 6/56
[52] U.S. Cl. .............................. 219/10.81; 219/10.57; 219/10.73
[58] Field of Search ............... 219/10.81, 10.53, 10.73, 219/10.57, 10.61 R, 10.75, 10.77, 10.69, 10.71; 156/274.4, 274.6, 274.8, 273.7, 273.9, 380.1, 380.2, 380.3, 380.4, 380.5, 380.6, 380.7, 380.8

[56] References Cited

U.S. PATENT DOCUMENTS

| | | | |
|---|---|---|---|
| 2,651,708 | 9/1953 | Mason et al. | 219/10.53 |
| 2,697,773 | 12/1954 | Gordon | 219/10.53 |
| 3,671,709 | 6/1972 | Gidge | 219/10.53 |
| 3,884,742 | 5/1975 | Roberts | 219/10.81 |
| 4,013,860 | 3/1977 | Hosterman et al. | 219/10.81 |
| 4,186,292 | 1/1980 | Acker | 219/10.81 |

Primary Examiner—P. H. Leung
Attorney, Agent, or Firm—Cahill, Sutton & Thomas

[57] ABSTRACT

A pair of jaws moveable with respect to one another whether mounted in a hand held sealer or desk mounted sealer, compresses, heats, elongates, spreads and welds liquid filled tubing placed therebetween. Variants of the pair of jaws provide means for serially or simultaneously segmenting the tubing into a plurality of sealed compartments. The pair of jaws are electrically connected to a source of RF energy as the plates of a variable capacitor in an RF resonant circuit. The flow of RF energy across the pair of jaws, which energy heats the tubing and, in conjunction with mechanical pressure, makes the weld, is a function of timing and of the spacing between the jaws which spacing affects the degree of resonance of the RF resonant circuit. Simultaneous with the heating of the tubing, the configuration of the pair of jaws compresses the tubing placed therebetween and focuses the RF energy in a narrow swath across the tubing while simultaneously elongating and spreading the tubing at the swath to obtain a leak free weld, which weld is configured to provide for separation of the sealed compartments without tearing or rupturing the compartments.

2 Claims, 20 Drawing Figures

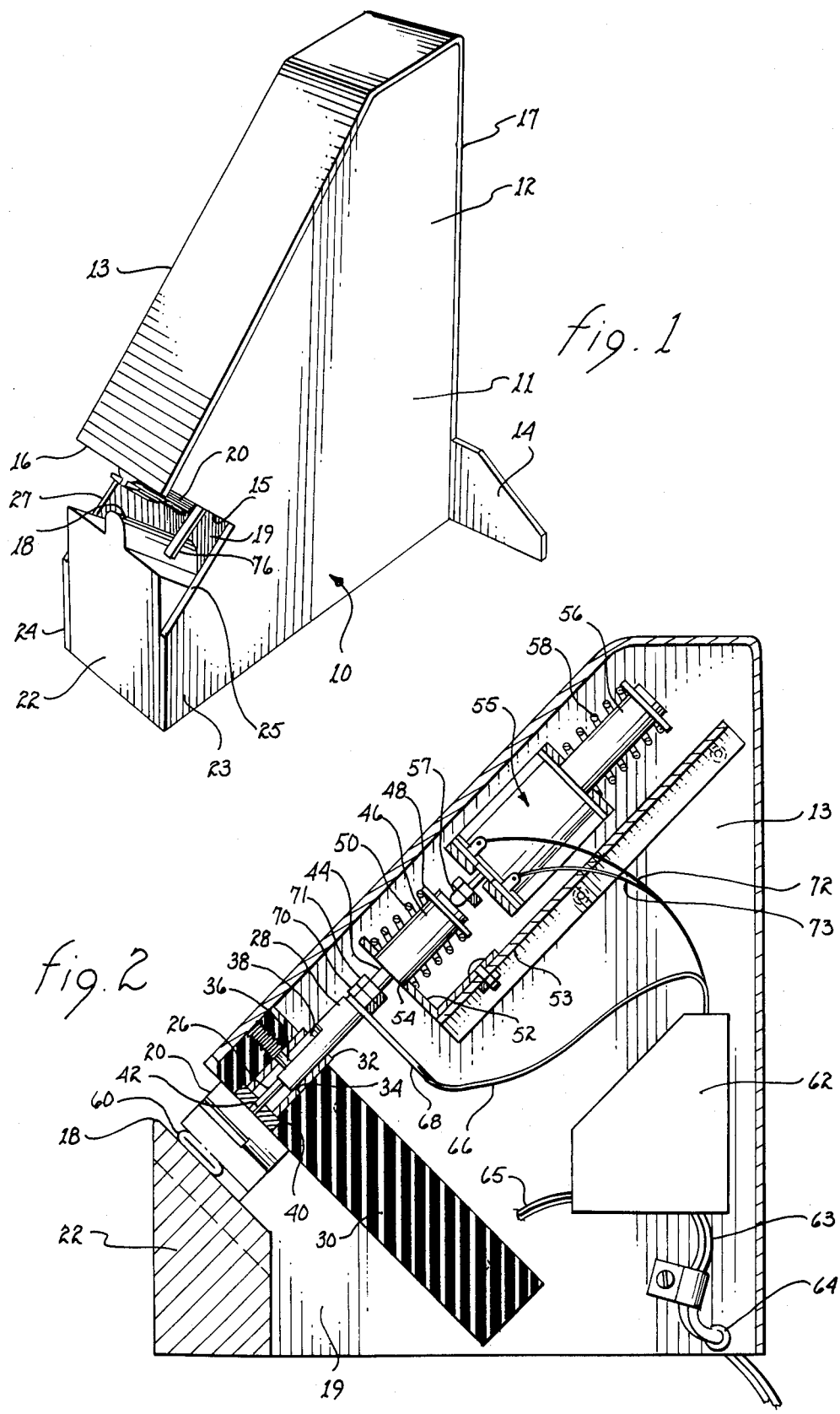

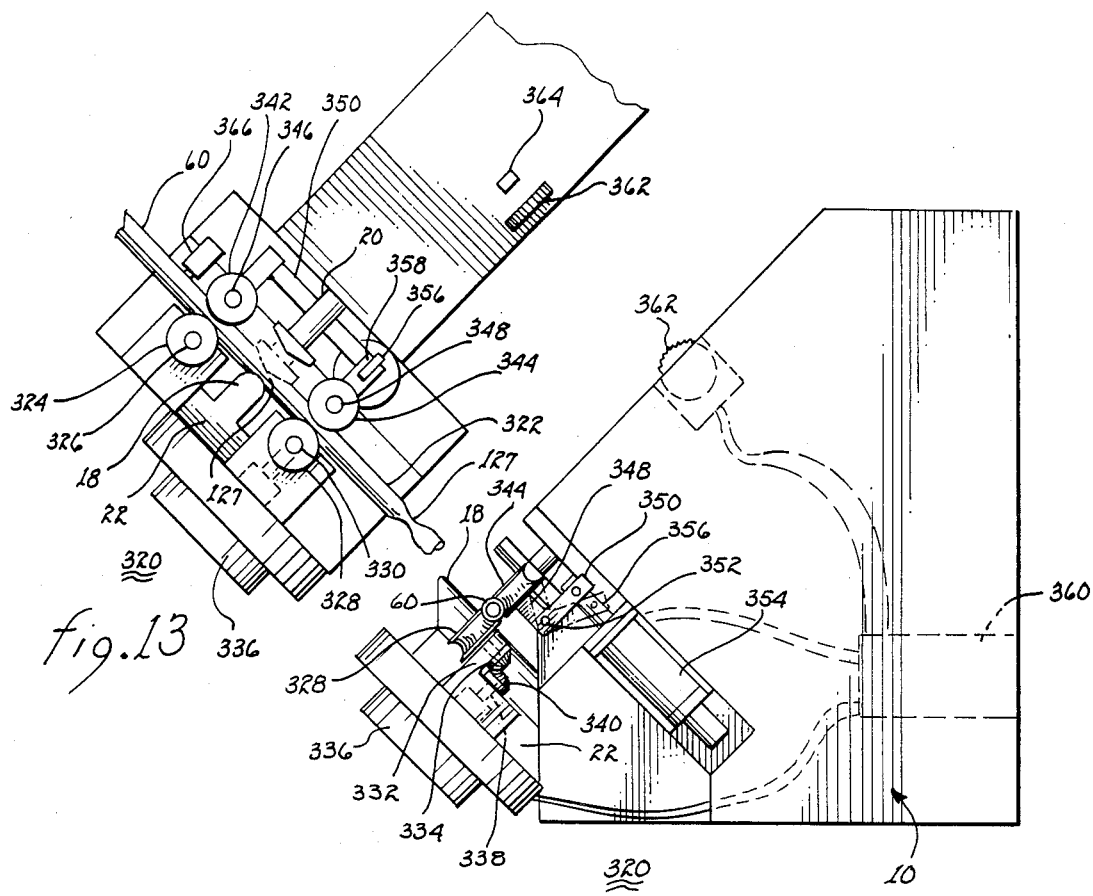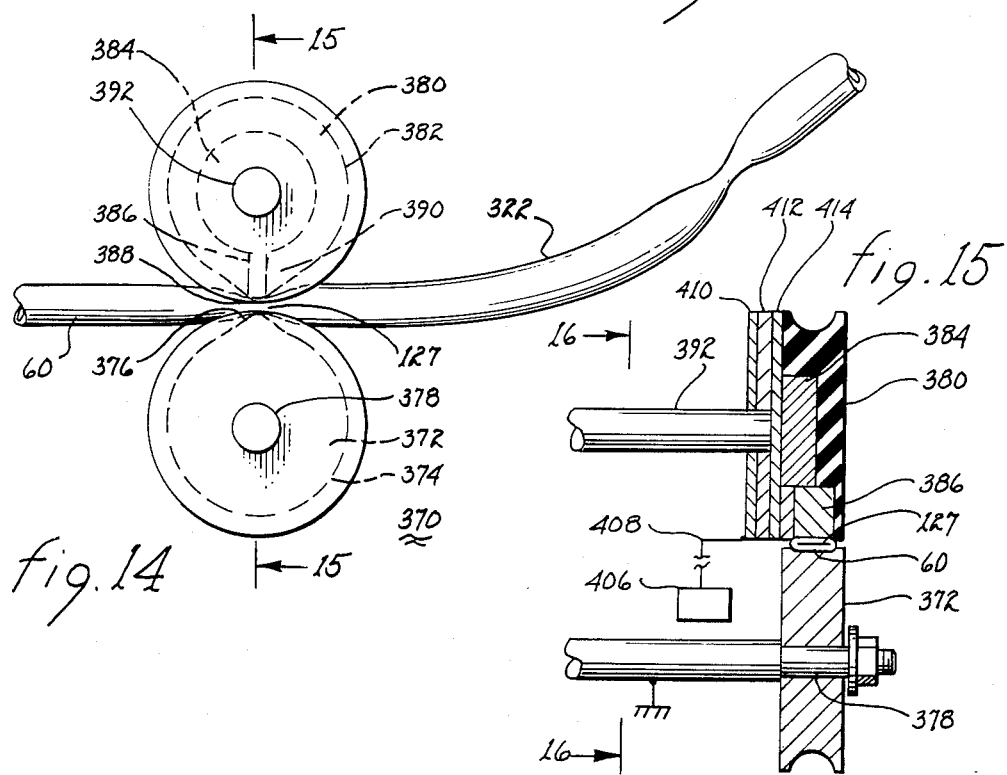

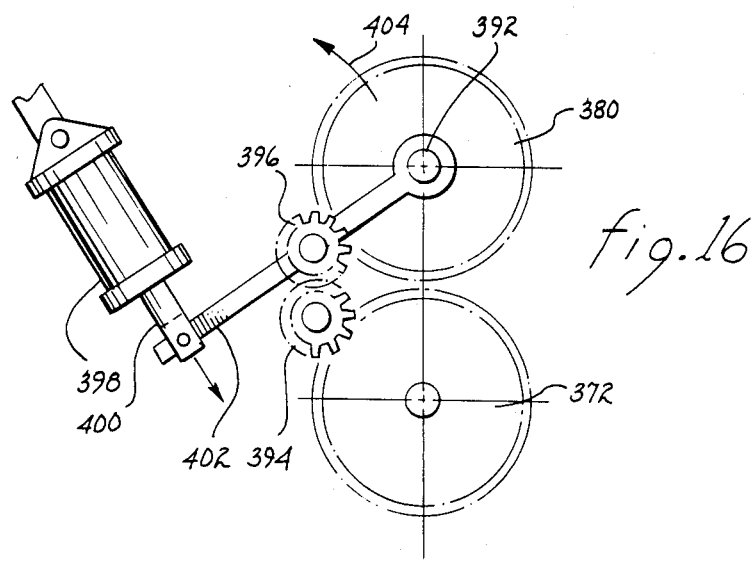
fig.16
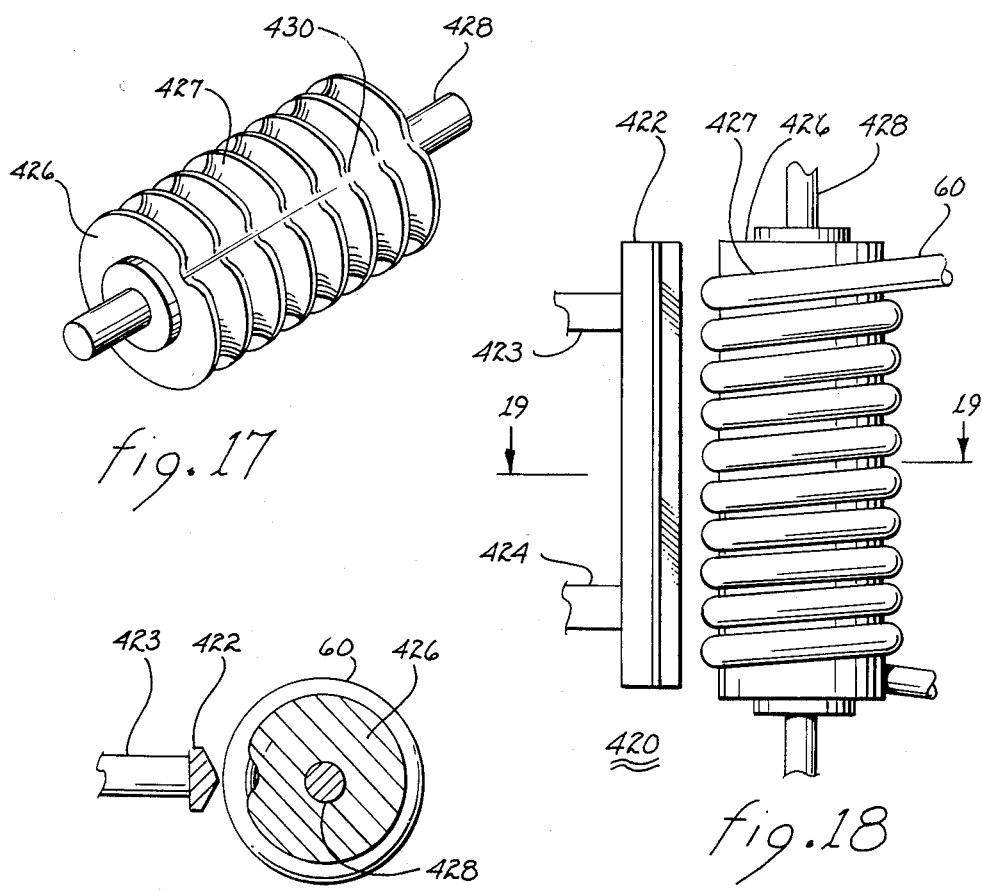
fig.17
fig.18
fig.19

ELECTRO MECHANICAL TUBING SEALER

This is a division of application Ser. No. 334,749, filed Dec. 28, 1981, now U.S. Pat. No. 4,390,832, which is a continuation of application Ser. No. 122,293, filed Feb. 19, 1980, now abandoned.

The present invention is related to an invention described in a patent application entitled "HAND HELD ELECTRO-MECHANICAL SEALER", filed April 9, 1976, and assigned Ser. No. 675,235, now U.S. Pat. No. 4,013,860 and a co-pending patent application entitled "DESK MOUNTED TUBING SEALER", filed on Oct. 11, 1977, assigned Ser. No. 840,655, now U.S. Pat. No. 4,186,292; both of these applications are assigned to the present assignee.

The present invention relates to heat sealers and, more particularly, to heat sealers for sealing liquid filled tubing.

The collection of blood from donors is a critical function performed in all towns, cities and metropolitan areas as the need by hospitals for fresh blood, plasma and other blood components never diminishes. Consequently, various blood collection centers have been established at permanent locations and mobile blood collection units are employed to service remote areas or to obtain blood from donors at specific high density locations, such as shopping centers, factories, office buildings, etc.

The process for collecting blood is a relatively simple process with respect to the donors' participation. However, the means for storing and preserving the collected blood requires relatively sophisticated equipment and techniques to minimize loss from contamination or spoilage.

U.S. Pat. No. 4,027,735, entitled "Blood Mixing and Weight Monitoring Apparatus", assigned to the present assignee, describes a device for collecting a predetermined weight of blood within a collection bag containing a premeasured quantity of preservative. In addition, the device includes a mechanism for clamping the tubing through which the blood flows into a collection bag. As a unit, this device is presently widely used and contains all of the equipment necessary to collect the blood within the collection bag and temporarily clamp the tubing attached to the bag until the tubing is permanently sealed.

To meet the need for readily and easily sealing blood filled plastic tubing, a hand held operated tubing sealer has been developed and is described in U.S. Pat. No. 4,013,860 entitled "Hand Held Electro Mechanical Sealer", and assigned to the assignee of the present application. This sealer is a readily transportable sealer of small size and it is hand operated to form heat seals in plastic tubing placed intermediate its jaws. Thus, it is readily useable to form seals in the tubing extending from the donor prior to the withdrawal of the needle from the donor; thus, a sterile closed system can be maintained. Also, a plurality of sealed segregated compartments along a length of the blood filled tubing can be completed, wherein each of the compartments is identified with a common serial number. Thereafter, the segregated compartments may be separated from one another and various tests may be performed upon the blood samples contained in the compartments. This capability is particularly important where testing is necessary and yet maintenance of the seal for the blood within the attendant collection bag is not to be disrupted or broken.

At many blood collection centers, such as those operated by the Red Cross, much of the manual labor is performed as charitable work by older persons. These persons often are physically handicapped by the natural processes of aging, by arthritis or by previous injuries. For those persons whose hands are not strong or who suffer pain when they attempt to grip tightly an article with their hands, the above described hand held sealer is difficult or painful to use. Consequently, the rate of production of seals is substantially slower than optimum.

To permit an adequate production rate by physically impaired volunteers, the desk mounted sealer described in co-pending patent application entitled "Desk Mounted Tubing Sealer", Ser. No. 840,655, was developed. It is useable by an operator who is either seated or standing and it provides for the operator in either position a direct line of sight to the work area. Thereby, operator fatigue is diminished and accurate sealing of the blood filled tubing is promoted. Through actuation of a tubing position sensing switch or a foot operated switch, a seal will be effected in the tubing placed intermediate a fixed and a moveable jaw, thereby allowing the operator to use one or both hands to repetitively place and reposition the tubing intermediate the jaws. The housing for the sealer sealingly encloses the operative elements and precludes seepage of blood thereinto should the blood filled length of tubing burst. The shaft supporting the moveable jaw and extending from within the housing is sealed through a wiping seal. The jaws themselves and the attendant structure are developed from large mass heat conducting material to dissipate the heat generated by the jaws and preclude heat buildup for the benefit of both the operator and the integrity of the formed seals.

It is well known that plastic materials may be welded to one another by the application of heat. The prior art devices developed for this purpose are essentially immobile units particularly adapted for mass production requirements. U.S. Pat. No. 2,529,717, describes an RF energized heat sealer wherein one electrode of a pair of electrodes is removeable to accommodate placement of the material to be sealed between the electrodes; a constant RF energy level is applied for a timed duration to effect the seal. U.S. Pat. No. 2,629,809 is directed to a manually operated device for compressing thermal plastic material between an anvil and a hammer whereupon RF energy is applied until the hammer has been raised to a predetermined height. U.S. Pat. No. 2,751,965 shows a bag sealer employing a first timing circuit for maintaining compressed the opening of the bag intermediate electrodes and a second timing circuit for applying a fixed level of RF energy. U.S. Pat. No. 3,040,153 illustrates a yarn splicer having a pair of pinchers for compressing yarn ends intermediate fixed position electrodes between which RF energy is transmitted to fuse the yarn ends to one another. U.S. Pat. No. 3,232,810 illustrates the use of a turned cavity to regulate the transmission of RF energy for sealing polyester materials. U.S. Pat. No. 3,518,396 is directed to a series of resonant circuits which preclude the work piece from altering the heat distribution pattern of a dielectric heating apparatus. U.S. Pat. No. 3,632,943 describes a dielectric sealer which incorporates a liquid filled coil as a cooling medium to insure uniformity of the seals; shield means are also employed to prevent spurious RF leakage. U.S. Pat. No. 3,738,892 illustrates two spaced apart conductive members for inductively heating and welding two adjacent sheets of plastic to one another without an attendant compression of the sheets.

In 1966, U.S. Pat. No. 2,729,732 was granted which describes a hand held device for generating a high frequency electric field for dielectric heating of glue. In operation, the electrodes of the device are positioned upon opposed sides of dielectric material sandwiched together with glue. On actuation of the electric field, the glue becomes heated and, on cooling, bonds the materials to one another. The device also includes manually adjustable means for regulating the electric field commensurate with the dielectric materials and the glue. U.S. Pat. No. 3,238,346, is directed to a hand held device having a ring element for circumscribing abutting ends of plastic pipes. The device inductively heats the ring and the heat therefrom is transferred to the plastic pipes to melt and fuse them.

In neither of the above described hand held devices is the amount of heat generated an automatically regulated function of the material to be heated or welded. Rather, the amount of heat to be applied and the quality of the bond being formed is primarily dependant upon the skill of the operator. Hence, neither of these hand held devices are satisfactorily useable by unskilled operators.

Plastic tubing, particularly of the type used in conjunction with the collection of blood, is relatively fragile and easily burst when heated to a temperature close to its melting point. To effectively and repetitively accurately heat seal or weld such tubing, certain parameters must be observed. The heat applied should be limited to the heat necessary to effect a weld. The locality of the applied heat should be focused upon the actual physical section upon which the weld is to be made to preclude softening of adjacent material, as such softening may permit the fluid, under pressure within the tubing, to burst the tubing.

As discussed above, it is common practice by blood collection centers to form a plurality of segregated compartments along the tubing and permit various tests upon the blood without breaking the seal of the collection bag or segregated tubing compartments itself. These compartments, or segments of tubing, are usually separated by tearing the tubing along the respective welds. If the welds are not sufficiently wide to permit a weakened tear area, one or the other of the compartments adjacent the weld may burst. The blood within the tubing is preferably physically displaced from the tubing in proximity to a to-be-made weld in order to effect a better seal by considerations based primarily upon the dielectric qualities of a tubing itself. Such displacement is best effected by compressing the tubing; yet, such compression must be limited in volume to prevent undue pressure build-up within the tubing.

It is therefore, a primary object of the present invention to provide a heat sealing unit for thermoplastic materials which incorporates a RF energy generating circuit regulated by the physical proximity and dielectric characteristics of the thermoplastic materials to be heat sealed.

Another object of the present invention is to provide a variable power output RF generator for use with a dielectric sealer.

Still another object of the present invention is to provide an RF energy generator for heat sealers wherein the power output level and duration thereof is dependent upon the varying dielectric characteristiecs of the thermoplastic material which occur during formation of the heat seal.

Yet another object of the present invention is to provide a pair of jaws for focusing RF energy transmitted therebetween to a predetermined pattern along the thermoplastic material to be heat sealed.

A further object of the present invention is to provide a pair of jaws for compressing thermoplastic material therebetween and elongating and spreading the material during transmission of RF energy between the jaws.

A still further object of the present invention is to provide a moveable jaw in a dielectric heat sealer for liquid filled tubing which evacuates the liquid in proximity to the location of the heat seal to be formed.

A yet further object of the present invention is to provide a means for automatically forming a plurality of sealed compartments or segments along a length of fluid filled tubing.

A yet further object of the present invention is to provide means for simultaneously forming a plurality of sealed compartments or segments along a length of fluid filled tubing with one operation of a single pair of jaws.

A yet further object of the present invention is to provide means for serially forming a predetermined number of sealed compartments or segments along a length of fluid filled tubing.

These and other objects of the present invention will become apparent to those skilled in the art as the description thereof proceeds.

The present invention may be described with greater specificity and clarity with reference to the following drawings, in which:

FIG. 1 illustrates a desk mounted sealer;

FIG. 2 illustrates the various components within the desk mounted sealer for effecting movement of a moveable jaw;

FIGS. 12 and 13 illustrate views of a first variant of a tubing transport mechanism;

FIGS. 14, 15 and 16 illustrate views of a second variant of a tubing transport mechanism; and FIGS. 17, 18 and 19 illustrate views of a third variant for simultaneously making a plurality of welds across segments of liquid filled tubing.

Figure 3:
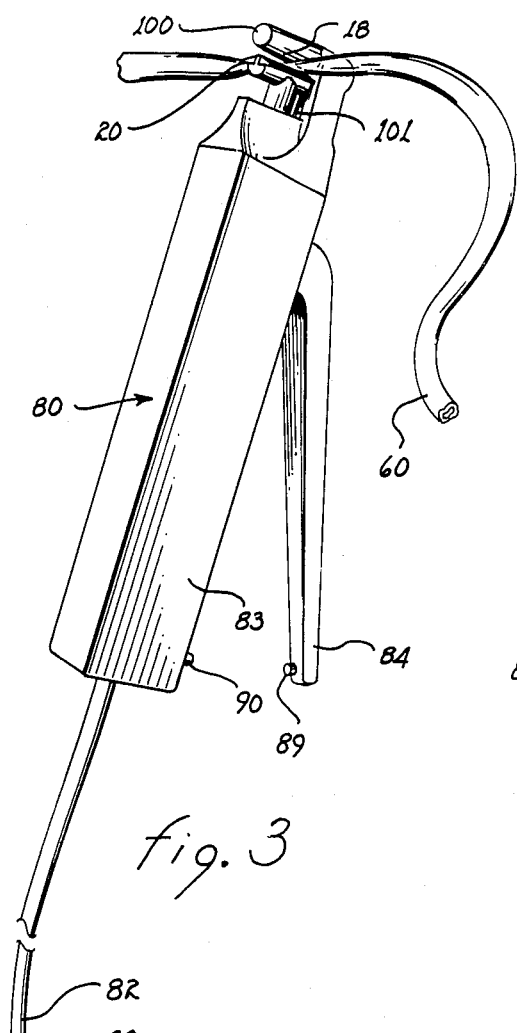
FIG. 3 is a perspective view of a hand held sealer.

FIG. 1 is a perspective view of a desk mounted sealer 10. The sealer includes a housing 11 having generally triangular sides 12 and 13. The width of the sealer is relatively thin, on the order of 1½ to 2½ inches. To prevent sideways tipping of the sealer, a stand 14 extends laterally from sides 12 and 13; as illustrated, the stand 14 may be of a length of sheet material, the central portion of which forms part of the enclosure defining housing 11. The lower front portion of the housing includes cutout sections 15 and 16 to provide lateral as well as vertical access intermediate fixed jaw 18 and movable jaw 20 disposed within the cutout section. A block 22 of heat and RF energy conducting material, which may be integral to fixed jaw 18, is attached to housing 11 through forwardly extending sections 23 and 24 of housing 11. A passageway 19 extends downwardly interior of block 22 and intermediate sections 23 and 24 whereby drainage of fluid from the fixed and movable jaws is readily effected in the event of spillage; moreover, this passageway, in combination with the cutout sections, affords sufficient room for the cleaning of any spilled fluid.

In the position shown, desk mounted sealer 10 is oriented for use by a person in a seated position. Herein, the edge of stand 14 rests against a surface and in combination with the base of housing 11 provides a stable T-shaped support for the sealer. The fixed and movable jaws are in general alignment with the operator's line of vision such that he/she may readily view the placement of tubing intermediate the jaws and view the actual sealing operation performed by the jaws. It may be noted that both of the operator's hands may be used to grasp the tubing on either side of sealer 10 to position and maintain the tubing in place during the sealing operation. Moreover, without changing the grip on the tubing, the tubing may be moved laterally in either direction and a plurality of welds defining intermediate compartments along the tubing may be easily formed.

By reorienting sealer 10 to position the planar side of stand 14 and rear edge 17 upon a supporting surface, the sealer is again supported by a stable T-shaped base which discourages tipping or tilting of the sealer during use. In this position, the fixed and movable jaws are in general alignment with a standing operator's line of sight. Accordingly, he/she can readily view the placement of the tubing intermediate the fixed and movable jaws and can watch the operation of the jaws to insure that formation of effective welds transverse to the tubing. Moreover, opposed ends of the tubing may be grasped and without altering one's grip on the tubing multiple welds can be made to form segregable liquid filled compartments in the tubing.

Turning now to FIG. 2, the structural features of the components embodied within the sealer will be described. Block 22 is attached to sides 12 and 13 by machine screws or by bolts extending from one side to the other side through the block. Fixed jaw 18 may be formed as part of block 22 or as a separate element rigidly secured to the block by welding, machine screws, etc. Movable jaw 20 is supported upon a shaft 26 extending from a cylindrical member 28. A block 30 of electrically insulating material defines one side of passageway 19 extending through housing 11 intermediate sections 23 and 24. A sleeve 32, disposed within a passageway 34 extending through block 30 provides a bearing and supporting surface for movable cylindrical member 28.

To maintain fixed jaw 18 and movable jaw 20 in longitudinal alignment with one another for a proper radiation pattern of RF energy therebetween, a threaded pin 36 extends from block 28 into passageway 34 to slidably mate with a longitudinally oriented slot 38 disposed within the surface of cylindrical member 37. Thereby, reorientation of movable jaw 20 about the axis of shaft 26 is precluded. A wiping seal 40 is lodged within an annular groove about the front end of passageway 34. A centrally located aperture 42 within the seal circumferentially engages shaft 26. By forming aperture 22 with a diameter less than that of shaft 26, flexing of the seal with a resulting wiping action upon the shaft will occur each time movable jaw 20 is translated along the axis of shaft 26.

A threaded shaft 44 extends rearwardly from cylindrical member 28 and supports a further cylindrical member 46, which is of electrically insulating material. A washer 48 is attached to the rear of cylindrical member 46 to maintain a spring 50 under compression intermediate the washer and a side wall 52 internal to housing 11. The function of spring 50 is that of maintaining movable jaw 20 generally adjacent block 30 during non-actuation of the sealer. An aperture 54 is disposed within side wall 52 to accommodate movement of cylindrical member 46 along the axis of shaft 26.

Actuation of movable jaw 20 is effected through electrically energized solenoid 55. The solenoid includes a spring loaded plunger 56 having a threadedly longitudinally adjustable end piece 57. Upon actuation of the solenoid, plunger 56 will be translated toward fixed jaw 18 and upon contact with the end of cylindrical member 46, translates, via cylindrical member 28 and shaft 26, movable jaw 20 toward the fixed jaw. On deenergization of solenoid 55, spring 58 will retract plunger 56 and spring 50, disposed about cylindrical member 46, will bear against washer 48 to retract movable jaw 20.

The extended position of movable jaw 18, indicated by the phantom lines, can be precisely controlled by means of threaded shaft 44 with respect to cylindrical member 46 and/or by the extension or retraction of end piece 57 with respect to plunger 56. Thus, exact and repetitive extension of movable jaw 20 is readily easily effected. It may also be noted that since the solenoid plunger and the shaft for the movable jaw are not mechanically interconnected, substantial misalignment therebetween is possible without deteriorating the operation of the movable jaw and without causing binding. Thereby, relatively inexpensive solenoids with relatively low quality bearings may be employed.

The solenoid and its operating mechanism may be segregated within housing 11 by side wall 52 and side wall 53 bearing against sides 12 and/or 13 of the housing.

A part of the circuitry employed in the present invention for effecting transmission of RF energy intermediate movable jaw 20 and fixed jaw 18 and which RF energy results in heating and partial melting of tubing 60 may be housed within compartment 62. The power on a signal input to the circuit is provided by conductor 63 extending into housing 11 through grommet 64. The output of the circuitry includes an electrical conductor 66 connected through electrical conductor 68 to cylindrical member 28 and retained in place by means of nuts 70 and 71 threadedly engaging shaft 44. A pair of electrical conductors 72 and 73 extend from within compartment 62 to electrically actuate the coil of solenoid 55. Selective energization of the circuit within compartment 62 may be effected through a foot operated switch (not shown) as discussed above, or by means of a miniature switch (not shown) having an actuation arm 76 (see FIG. 1) responsive to placement of tubing 60 intermediate fixed jaw 18 and movable jaw 20. Whichever type of switch is employed, the switch is electrically connected to the circuitry within compartment 62 through electrical conductor 65.

The miniature switch may be mounted within a cavity disposed within block 30; alternatively, the miniature switch may be located exterior of housing 11. Arm 76, pivotally attached to the miniature switch, is pivotally responsive to downward movement of tubing 60 intermediate fixed jaw 18 and movable jaw 20. Pivotal movement of the arm brings the arm to bear against the pin of the microswitch to electrically close the circuit within compartment 62.

To properly position tubing 60 intermediate the fixed and movable jaws, upper edges 25 and 27 of sections 23 and 24 serve as supports below which the tubing cannot be forced. The location of the miniature switch is selected such that arm 76 is vertically positioned in relation to edges 25 and 27 whereby full downward pivotal movement of the arm results upon resting of the tubing against the edges. Thereby, on insertion of tubing 60 intermediate the fixed and movable jaws, the circuit within compartment 62 is energized. On energization, solenoid 55 is actuated to force the movable jaw toward the fixed jaw. Simultaneously, a time based and power level controlled burst of RF energy is generated and transmitted through electrical conductor 66, electrical conductor 68, cylindrical member 28, and shaft 26 to movable jaw 26. The return path for the generated RF energy is through ground return jaw 18 and sections 23 and 25, which are electrically conducting.

On positioning of the movable jaw adjacent to but not in contact with the fixed jaw, tubing 60 will be squeezed (as indicated in FIG. 2) to bring the tubing interior opposing surfaces adjacent one another. A burst of RF energy of a predetermined value is then transmitted from the movable jaw to the fixed jaw through the tubing. Tubing 60 presents a resistance to the RF energy transmitted therethrough resulting in the development of sufficient heat to partially melt or soften the tubing and weld the opposed tubing surfaces to one another. As stated in further detail in the above identified U.S. Pat. No. 4,013,860, the initial transmission of RF energy through the tubing during compression of the tubing results in some heating of the tubing and provides greater compliancy by the tubing into the squeezed configuration illustrated in FIG. 2.

After a predetermined time period, the circuit terminates the generation of RF energy, to allow the tubing to cool by dissipating heat to the jaws and ambient air and solenoid 55 is deenergized. Upon deenergization of the solenoid, the movable jaw is retracted and tubing 60 may be removed. The heat generated during the welding operation as well as the slight heating of the jaws themselves is rapidly and effectively dissipated through block 22 which serves as a heat sink. Additionally, sections 23 and 24, being of aluminum or similar heat transmitting material, readily dissipates the heat to housing 11 and the ambient air. Accordingly, except for a slight temperature rise of no concern to the operator, continuous and rapid welding operations may be undertaken indefinitely.

Referring to FIG. 3, there is illustrated a hand held tubing sealer 80 electrically connected to a power supply and RF energy generating circuit 81 by an electrical cord 82; alternatively, a portion of the RF energy generating circuit may be contained within the body of the sealer. The tubing sealer includes a body 83 having a pivotable somewhat flexible handle 84 extending therefrom. A length of plastic tubing 60 to be welded is positioned intermediate a fixed jaw 18 and a movable jaw 20.

As described above, hand held tubing sealer 80 was developed for the purpose of hermetically sealing the plastic tubing extending from a filled blood collection bag. To accomplish this goal, switch 88 of power supply 81 is switched to the ON position to provide power to the tubing sealer. After insertion of tubing 85 intermediate jaws 18 and 20, handle 84 is drawn toward body 83, which movement causes jaw 20 to extend toward jaw 18 and partially compress plastic tubing 60 therebetween. Simultaneously, tit 89 on handle 84 actuates a switch 90 to supply a burst of RF energy through conductor 66 attached to end 106 of rod 94 and across jaws 20 and 18.

Arm 93 extends from handle 84 internal to body 83 and serves as one of the elements for effecting displacement of jaw 20 toward jaw 18. A rod 94 is journalled within a cylindrical passageway 95 extending through bulkhead 96. Arm 93 is clevis shaped such that an arm of the clevis is positioned on either side of a rod 94. A clevis pin 97 extends through the rod for engagement with each of slots 98 within the arms of the clevis. Retaining washers 99 or similar means ensures that the pin is retained in place.

Figure 6:
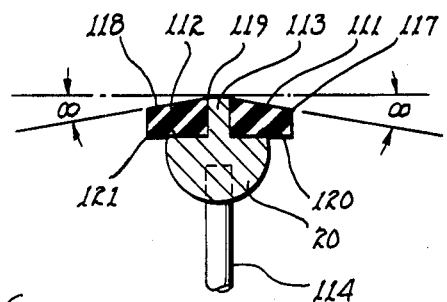
FIG. 6 is a cross-sectional view taken along line 6—6, as shown in FIG. 5.
Figure 5:
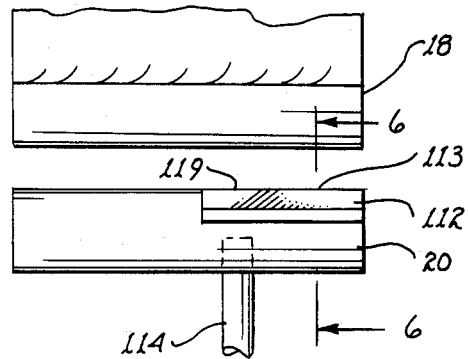
FIG. 5 illustrates a side view of the fixed and moveable jaws.
Figure 7:
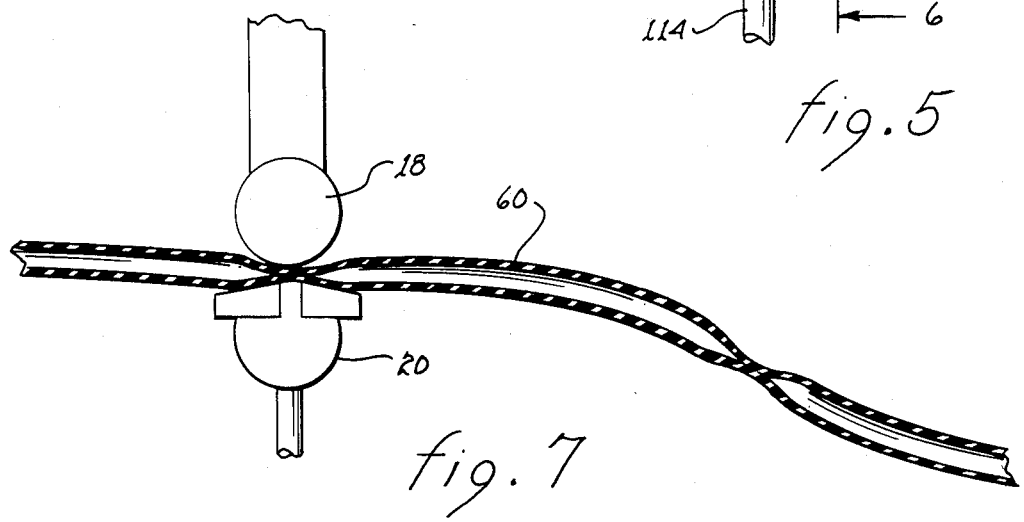
FIG. 7 illustrates operation of the fixed and moveable jaws upon placement of a length of dielectric tubing therebetween.

Jaw 18 is configured as a post and is mounted within a slotted cylindrical cavity 100. Jaw 20, configured as illustrated in FIGS. 5, 6 and 7, is retained within a correspondingly configured channel 101 at the extremity of rod 94. A threaded thumb wheel 102 threadedly engages threaded section 103 of rod 94. By repositioning thumb wheel 102 along the rod, the repositioning of the rod toward jaw 18 is thereby limitable by the thumb wheel contacting bulkhead 96. Thus, the proximity of jaw 20 to jaw 18 can be readily and accurately controlled to be commensurate with the diameter and wall thickness of tubing 60.

In operation, as handle 84 is drawn toward body 83, arm 93 is pivoted forwardly, which action causes the rear edge of slots 98 to bear against clevis pin 97. The force exerted upon the clevis pin results in translatory motion of rod 94 within passageway 95 and movement of jaw 20 within channel 101 toward jaw 18 until further movement is constrained by thumb wheel 102 engaging bulkhead 96. As it is conceivable that pivotal movement of arm 93 may be restrained by thumb wheel 102 engaging bulkhead 96 prior to engagement of tit 84 with switch 90, handle 84 must necessarily be flexible to allow full travel of the extremity of the handle into contact with body 83. The flexibility of handle 84 also has another purpose. When the flexible tubing is initially positioned intermediate jaws 18 and 20, it, in a cool state, may be sufficiently rigid to preclude the full mechanically permissible movement of jaw 20. However, as handle 84 is sufficiently flexible to permit tit 89 to depress switch 90 even though jaw 20 is not fully repositioned, power is applied across the jaws which tends to heat the plastic tubing and cause it to soften, melt and seal. Upon softening, the plastic tubing becomes more compressible, which compression will occur because of the flexed handle applying a bias upon arm 93 and ultimately exerting a force upon jaw 20 until the thumb wheel comes into contact with the bulkhead.

Figure 4:
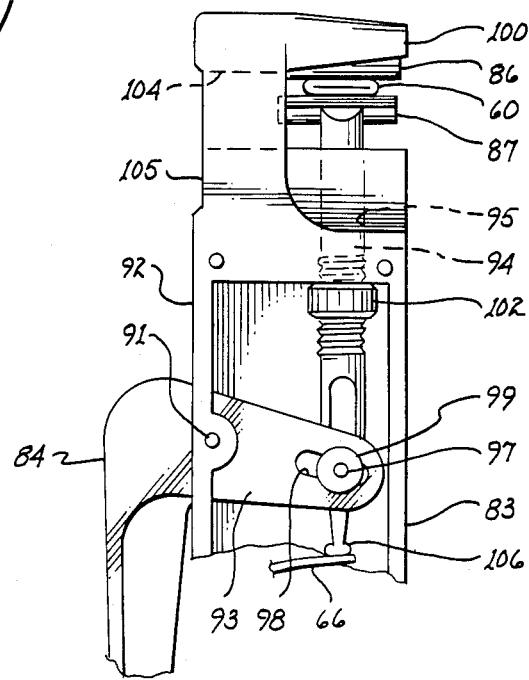
FIG. 4 is a partial cut-away view illustrating mechanical aspects attendant the moveable jaw of the hand held sealer.

From FIGS. 3 and 4, it may be noted that the side walls of body 83 are recessed intermediate jaws 18 and 20 to readily receive a length of plastic tubing for positioning intermediate the jaws. Moreover, an aperture 104 is disposed within surface 105 in proximity to the lower ends of the jaws. This aperture permits ready cleaning in the event of rupture of the tubing being welded. Cover 100 is also slidably removable from around jaw 18 for cleaning purposes.

The tubing sealer is illustrated in the actuated position in FIG. 4. It may be noted that handle 84 is essentially parallel to surface 105 of body 83 which has caused rod 94 to be translated toward jaw 86 along its longitudinal axis. The translatory movement has been limited by thumb wheel 102 engaging bulkhead 96. In this position, tubing 60 has been compressed intermediate the jaws such that opposed inner surfaces thereof are in contact with one another.

Cylindrically shaped jaws, whether used in the desk or hand sealer, tend to soften, melt and weld a relatively wide swath transverse to the longitudinal axis of the tubing to be welded. The resulting weld is relatively wide. Because a substantial section of the tubing would melt, there exists the possibility of the tubing wall immediately adjacent the weld and defining a part of a liquid filled compartment to rupture in response to the reduced tensile strength of the wall in combination with the pressure present within the liquid filled compartment. To overcome the possibility of the above described problem from occuring, the configuration for the moveable jaw 20 illustrated in FIGS. 5, 6 and 8 was developed.

Jaw 20 includes a pair of wedge-shaped inserts 111 and 112 disposed at the forward side of the jaw and displaced from one another by a narrow ridge 113. As described above, the jaw is supported upon and positioned by an attached rod 114. As jaw 20 is brought into proximity with cylindrical jaw 18 after a length of tubing 60 has been placed therebetween, as illustrated in FIG. 7, several events transpire simultaneously. Inserts 111 and 112 tend to squeeze the tubing against a part of jaw 18 for a distance longitudinally displaced from the section of tubing immediately adjacent contacting surface 119 of ridge 113. Thereby, the fluid within the tubing is forced to flow away from the immediate proximity of the tubing melt area during the melting/welding process. With the removal of the fluid, the pressure attendant thereto will not exert a force upon the softened or melted walls of the tubing during the melting-/welding process and the possibility of inadvertent rupture is substantially eliminated.

The inserts are of a dielectric composition which may be ceramic, which composition has a different coefficient of RF energy transmissivity than the jaws themselves. Thereby, the tubing adjacent the inserts tends not to be heated by the RF radiation, which further reduces the possibility of rupture. Plastic material could be used for the inserts provided that the expected vaporization thereof was acceptable or otherwise controllable.

The use of ridge 113 in jaw 20 tends to more discretely focus the transmission of RF energy through the tubing to jaw 18. Such focusing results in melting of the tubing only along a relatively narrow swath transverse to the longitudinal axis of the tubing. Moreover, with such focusing of the RF energy, significantly better regulation and control of the power level of the RF energy necessary to effect a weld is easily and readily achieved. The better control and regulation also provides for the possibility of deploying a lower power level without compromising the quality of the welds to be made or lengthening the seal time.

By experimentation it has been learned that if the configuration of inserts 111, 112 and ridge 113 are maintained with certain parameters, optimum results are acheived. It has been learned that movable jaw having a diameter of $\frac{3}{8}''$ (0.375 inches) produces an optimum sized jaw with respect to typical blood tubing size currently in use. With such a diameter, the optimum width of ridge 113 (width of surface 119) is in the range of 0.080 to 0.100 inches. If the width is more than 0.120 inches, the inserts tend to be positioned too far laterally to be effective in mechanically squeezing the tubing and forcing the tubing to spread intermediate the jaws during melting. A width less than 0.080 inches yields an insufficient weld. For generalized application, ridge 113 should be 2-3 times the width of the compressed tubing prior to sealing. Insert surfaces 117, 118 of inserts 111, 112, respectively, are oriented to extend tangentially from their respective point of contact upon the cylindrical surface of jaw 20. Angle $\alpha$, defined by surfaces 117 and 118 and a line tangent to the longitudinal center of surface 119, is in the range of 5 to 15 degrees. The wedge faces may alternatively consist of multiple facets. Stated in a more generalized form, the width of ridge 113 is approximately equivalent to $\frac{1}{4}$ of the diameter of a cylindrical configuration for jaw 20 and each of the inserts extends tangentially from its point of contact with the cylindrical surface of the jaw.

Figure 8:
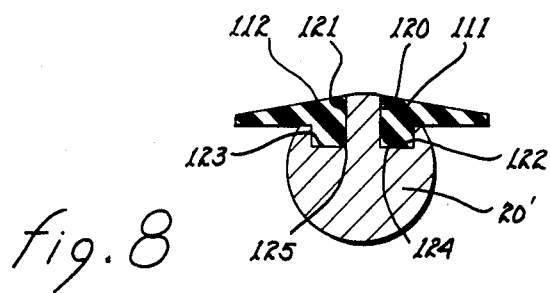
FIG. 8 is a cross-sectional view illustrating a variant of the moveable jaw shown in FIG. 6.

In the embodiment illustrated in FIGS. 5 and 6, inserts 111 and 112 are deposited and secured within right angle troughs 120 and 121 extending longitudinally within jaw 20. Such a means of attachment provides some physical interlock between the inserts and the jaw. A configuration which provides a positive lateral interlock between the inserts and the jaw is illustrated in FIG. 8. Herein, keyways 122 and 123 are formed within troughs 120 and 121, respectively. Corresponding keys 124 and 125 are formed as part of inserts 111 and 112 for mating with the respective keyways. Thereby, any lateral forces which may be imposed upon the inserts are countered not only by the adhesive means attaching the inserts but also by the physical interference provided by the keys and keyways.

Figure 9:
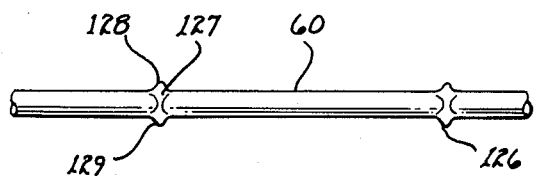
FIG. 9 illustrates seals effected along a length of thermal plastic tubing.

FIG. 9 illustrates a length of tubing 60 having a pair of welds 126 and 127 developed therein. It may be noted that each of these welds includes tabs 128 and 129 extending laterally from the weld and beyond the perimeter of the tubing proper. These tabs provide physical proof that the weld resulted from sufficient melting of the tubing to produce a change in configuration of the tubing, which change was precipitated by the squeezing action of the jaws.

Figure 10A:
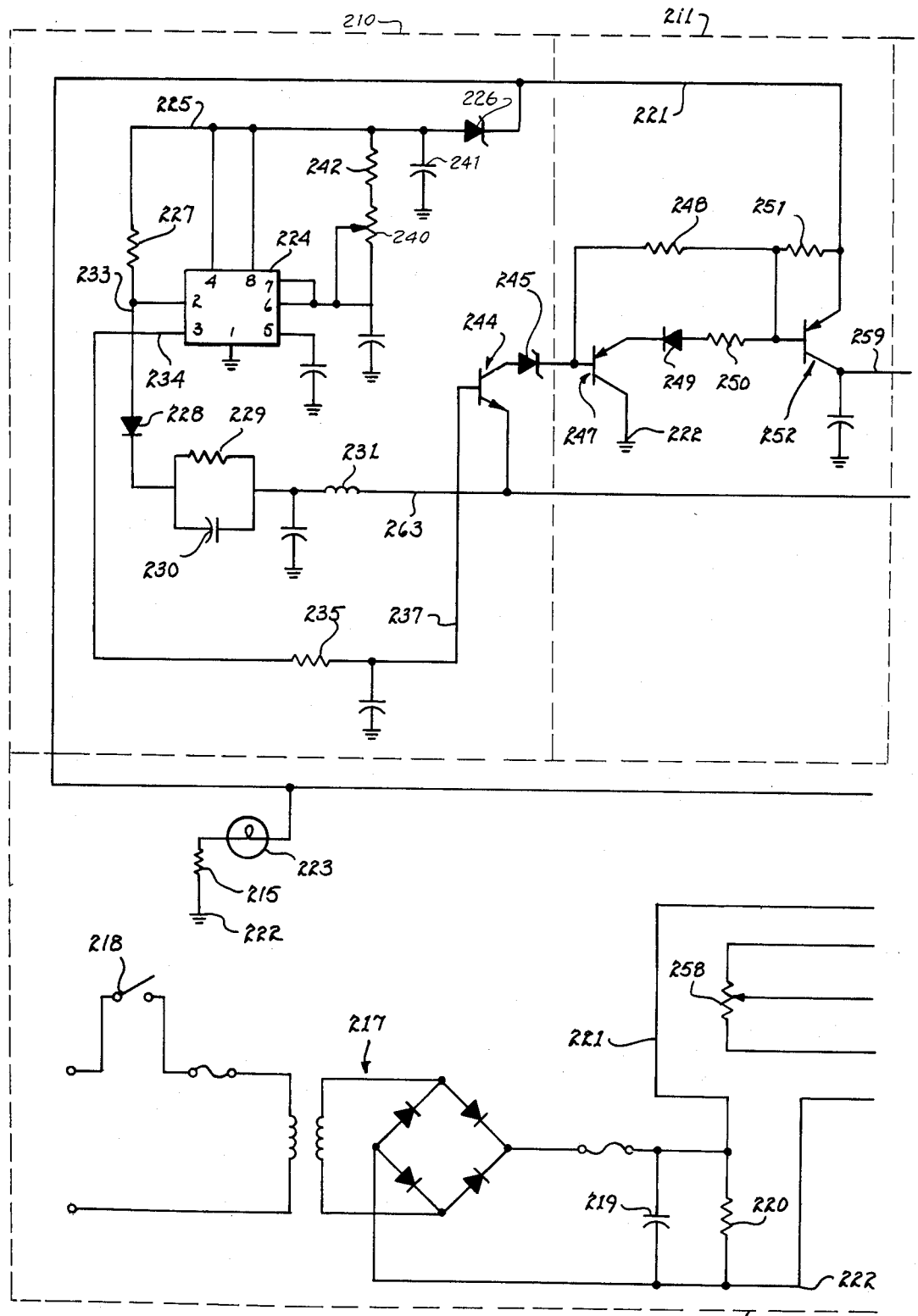
FIGS. 10a and 10b illustrate a circuit for generating RF energy.
Figure 10B:
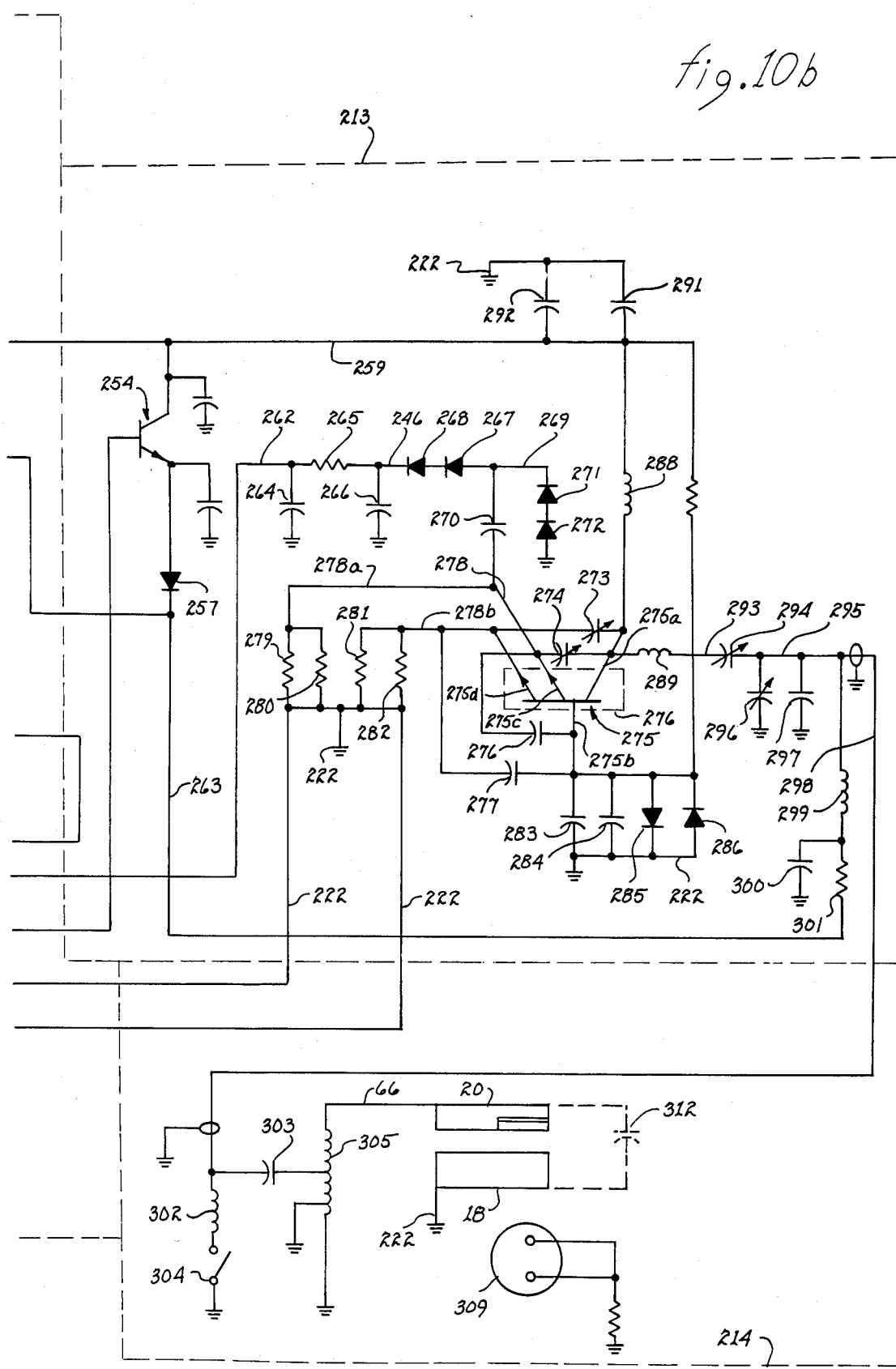

The circuit shown in the schematic diagram of FIGS. 10a and 10b together form a complete schematic diagram of an electronic system which supplies high frequency electromagnetic energy to the movable jaw, the fixed jaw and to the tubing to be sealed.

It has been found that there are several sources of substantial variation in impedance presented by a tubing sealer. The most important of these is variation in capacitance due to variation in size and location of the user's hand(s) on the sealer. Another source of variation in impedance results from variation in capacitance of the tubing itself. Different sizes and types of tubing as well as aging of the tubing cause variations in effective capacitance. A further source of impedance variation is due to movement of the movable jaw relative to the fixed jaw; when sufficient energy has been received by the tubing clamped between the movable jaw and the fixed jaw, the tubing will melt and the jaws will move even closer together and decrease the effective impedance.

These variations in impedance may be greater than two to one. Consequently, substantial impedance mismatching between the power oscillator, (supplying high frequency electromagnetic energy to the jaws) and the jaws (load) occurs due to the above mentioned variations in capacitances. Accordingly, the amount of energy supplied to the tubing varies and generally will result in improper or unreliable welds.

The electronic system illustrated in FIGS. 10a and 10b, provides high frequency electromagnetic energy (RF energy) which is transferred to the clamping jaws; simultaneously, the circuit detects or responds to variations in impedance as they may occur and self adjusts the output power level to maintain constant the amount of power received or absorbed by the tubing.

The electronic system includes a DC power supply circuit 216 which converts AC power into a filtered DC supply voltage of approximately 24 volts. For mobile sealers a DC power source may be substituted. A timing circuit 210 produces a drive signal of predetermined duration which drives a solid state switch circuit 211. A power oscillator circuit 213 includes a 40.68 megahertz power oscillator. The output of the power oscillator circuit is coupled by a coaxial cable 298 to sealer assembly 214.

Sealer assembly 214 includes fixed jaw 18 and a movable jaw 20, between which the tubing (not shown) is placed.

DC power supply circuit 216 includes an on/off switch 218 and a rectifier 217 having a transformer and a conventional diode bridge. The rectified output voltage between conductor 221 and ground conductor 222 is filtered by means of capacitor 219. Exemplary values of capacitance and resistance for capacitor 119 and resistor 120 are shown in Table 1 below along with examplary values for all other components described hereinafter.

Resistor 215 and indicator 223, to indicate energization of the DC power supply, are connected in series between ground conductor 222 and conductor 221.

Timing circuit 210 includes a digital timer 224, which can be implemented by a Model 555 digital timer integrated circuit manufactured by Texas Instruments, Inc., and other manufacturers. Zener diode 226 provides a suitable DC operating voltage for digital timer 224. The circuit including resistors 240 and 242 and capacitor 241 determines the duration of the output pulse produced on output lead 3 of digital timer 224, which output lead is connected to conductor 234. Control lead 2 of digital timer 224 is connected to conductor 233. Resistor 227 is connected between conductor 225 and conductor 233. Conductor 225 is connected to the anode electrode of zener diode 226. The anode electrode of diode 228 is connected to conductor 233 and its cathode electrode is connected to resistor 229 and capacitor 230, which resistor and capacitor are connected in parallel. Radio frequency choke 231 interconnects resistor 229 and capacitor 230 with conductor 263. As will be subsequently described, a negative going pulse on conductor 263 causes digital timer 224 to begin the timing cycle.

Output conductor 234 is coupled through resistor 235 and conductor 237 to the base electrode of transistor 244. The emitter electrode of transistor 244 is connected to conductor 263. The collector electrode of transistor 224 is coupled by zener diode 245 to the base electrode of transistor 247 of solid state switch circuit 211.

The collector of electrode transistor 247 is connected to ground conductor 222. The emitter electrode of transistor 247 is coupled by diode 249 and resistor 250 to the base electrode of transistor 252. The voltage at the base electrode of transistor 252 is fed back through resistor 248 to the base electrode of transistor 247. The emitter electrode of transistor 252 is connected to DC voltage conductor 221 and is also connected by resistor 251 to the base electrode of transistor 252. The collector electrode of transistor 252 is connected to conductor 259, which provides regulated DC power to the power oscillator circuit 213. Transistor 247 can be implemented

TABLE 1

| Reference Numeral | Resistance | Reference Numeral | capacitance | Reference Numeral | Inductance |
|---|---|---|---|---|---|
| 227 | 5KΩ | 243 | 47 uf | 131 | 15 uh |
| 242 | 10KΩ | 238 | .01 uf | 199 | 15 uh |
| 240 | 50KΩ | 241 | 10 uf | 202 | 15 uh |
| 229 | 5.6KΩ | 230 | 470 pf | 188 | 9T-¼"D 16 ga. wire |
| 235 | 1KΩ | 232 | .033 uf | 189 | 5T-⅜"D |
| 248 | 1KΩ | 236 | .0033 uf | 205 | B + W #3007 |
| 251 | 330Ω | 253 | .01 uf | | |
| 250 | 10Ω | 255 | .01 uf | | |
| 265 | 1KΩ | 292 | 50 uf | | |
| 290 | 68Ω | 291 | .1 uf | | |
| 279 | 10 (1–2 uh) | 264 | 47 uf | | |
| 280 | 10 (1–2 uh) | 266 | .01 uf | | |
| 281 | 10 (1–2 uh) | | | | |
| 282 | 10 (1–2 uh) | 256 | .01 uf | | |
| 301 | 220Ω | 273 | 170–180 uf | | |
| 219 | 180Ω | 274 | 170–180 uf | | |
| 258 | 25KΩ | 277 | 680 pf | | |
| 220 | 1500Ω | 276 | 680 pf | | |
| 210 | 18KΩ | 194 | 110–600 pf | | |
| | | 196 | 80–300 pf | | |
| | | 197 | 150 pf | | |
| | | 183 | .01 uf | | |
| | | 184 | .01 uf | | |
| | | 200 | .003 uf | | |
| | | 203 | 100 pf | | |
| | | 119 | 35K uf | | | by a General Electric D45C5. Transistor 252 can be implemented by a 2N4399 PNP transistor.

Figure 11:
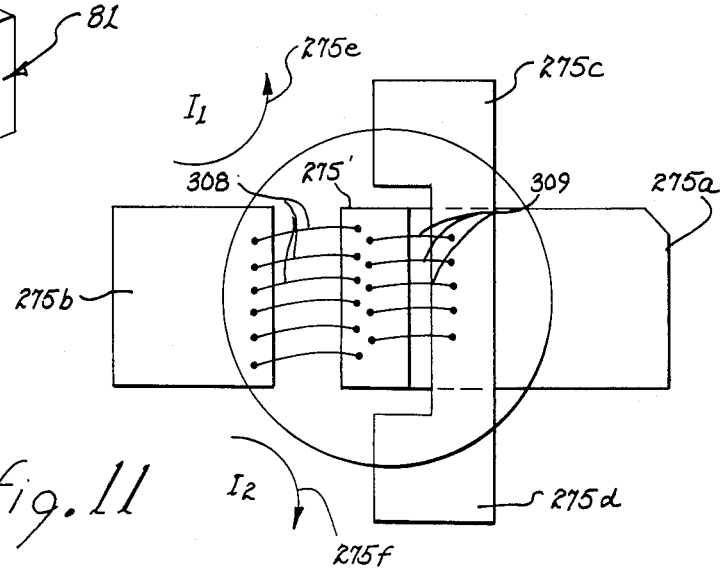
FIG. 11 illustrates the physical structure attendant a component of the circuit shown in FIG. 10b.

Power oscillator circuit 213 includes a grounded base oscillator. Transistor 275, which may be implemented by a Motorola MRF422 dual emitter SOE (strip line opposed emitter) transistor housed in a package indicated by dotted line 276. The configuration of dual emitter SOE transistor 275 is illustrated in FIG. 11, wherein transistor chip 275' has a substantially elongated configuration and is mounted on collector lead 275a. A plurality of base bonding leads 308 connect a plurality of base contact points to base lead 275b. A plurality of emitter contact points distributed along chip 275' are connected by means of a plurality of emitter bonding leads 309 to an emitter conductor which includes opposed ends 275c and 275d. This configuration permits balanced biasing of the emitter base junction at very high frequencies. The Motorola MRF 422 transistor is capable of operating at a power output level of over 100 watts at frequencies of 40 Mhz. (The exact United States operating frequency of 40.68 Mhz, is one of those allocated by the FCC for medical instruments; in portions of Europe the allocated frequency is 27.12 Mhz). However, if current $I_1$ indicated by arrow 275e and current $I_2$ indicated by arrow 275f are not precisely equal during high frequency, high power operation, increased power dissipation will result along the portion of the emitter base junction adjacent the lead conducting the higher current. This will produce thermal imbalances which can result in destruction of the transistor.

Referring again to FIGS. 10a and 10b, the base lead 275b of transistor 275 is connected to conductor 287, which conductor is coupled by means of capacitors 283 and 284 to ground. Conductor 287 is also connected to the anode electrode of diode 285 and the cathode electrode of diode 286. The cathode electrode of diode 285 and the anode electrode of diode 286 are connected to ground conductor 222. Diode 285 operates to bring about initial forward biasing of transistor 275 when an initial voltage rise is produced on conductor 259, thereby causing oscillation to begin. Diode 286 prevents the emitter-base reverse breakdown voltage of transistor 275 from being exceeded during operation of the power oscillator circuitry.

First emitter lead 275c is connected to capacitor 270 through conductor 278 and to resistors 279, 280 through conductor 278a. Second emitter lead 275d is connected to resistors 281, 282 through conductor 278b. Emitter leads 275c and 275d are coupled by means of variable feedback capacitors 274 and 273, respectively, to collector lead 275a of transistor 275. Emitter leads 275c and 275d are coupled by capacitors 276 and 277, respectively, to the base of transistor 275. In accordance with the teachings of the invention, the technique of providing dual balanced feedback to emitter leads 275c and 275d provides balanced transistor operation at the high 40 megahertz frequency to assure balanced internal transistor operation and to avoid internal thermal imbalances which would otherwise result in destruction of the transistor under high current, high frequency operating conditions.

Collector electrode 275a of transistor 275 is also coupled by means of inductor 288 to regulated voltage conductor 259. Capacitors 291 (a mylar capacitor which operates effectively as a bypass capacitor at high frequencies) and 292 (an electrolitic capacitor which operates effectively as a low frequency bypass capacitor) are connected between conductor 259 and ground conductor 222. Emitter leads 275c and 275d are coupled by means of wire wound and carbon resistors 279, 280, 281 and 282, respectively, to ground conductor 222. Emitter leads 275c is connected by capacitor 270 to conductor 269. Diodes 271 and 272 are connected in series between ground and conductor 269, the anode electrode of diode 272 being connected to ground and the cathode electrode of diode 271 being connected to conductor 269. Diodes 267 and 268 are connected in series between conductor 269 and conductor 246, the cathode electrode of diode 267 being connected to conductor 246 and the anode electrode of diode 268 being connected to conductor 269. Capacitors 264 and 266 and resistor 265 form a filter which couples conductor 246 to conductor 262.

Conductor 262 is coupled by means of variable resistor 258 to the base electrode of a 2N3568 NPN transistor 254, which has its collector electrode connected to conductor 259 and its emitter electrode coupled through diode 257 to conductor 263.

Collector electrode of transistor 275 is coupled by inductor 289 to conductor 293. Variable capacitor 294 is coupled between conductor 293 and conductor 295, the latter being connected to ground through variable capacitor 296 and fixed capacitor 297. Conductor 295 is coupled to a fixed length of coaxial cable 298. Conductor 295 is also coupled by radio frequency choke 299 and resistor 301 to conductor 263 and grounded through capacitor 300.

Coaxial cable 298 couples the power produced by power oscillator circuitry 213 to sealer assembly 214. The opposite end of coaxial cable 298 is connected by radio frequency choke 302 and switch 304 to ground and is also coupled through capacitor 303 to a tab of inductor 305. Inductor 305 may be implemented by a Baker & William 3007 inductor. Fixed jaw 18 is connected to ground conductor 222 and movable jaw 20 is connected to one end of inductor 305 through conductor 66. The opposite end of the inductor is connected to ground conductor 222. Neon lamp 310 is disposed in the vicinity of conductor 66 and is energized by its electromagnetic field to provide a visual indication to the operator that power is being coupled to the tubing.

The operation of the circuits shown in FIGS. 10a and 10b will now be described. After a length of tubing is placed between fixed jaw 18 and movable jaw 20, the operator energizes the sealer by squeezing the handle of the hand held sealer or by actuating a switch of the desk model sealer. Switch 304 will be closed and ground the center conductor of coaxial cable 298 and ground conductor 295. This causes a negative going pulse to be applied to conductor 263, which in turn produces a logical zero on input lead 2 of digital timer 224. At the same time, the emitter electrode of transistor 244 is also grounded. An output current pulse is then produced by digital timer 224 on conductor 234. The duration of the output pulse is controllable by varying adjustable resistor 240; preferably, the pulse has a duration in the range of 0.5 to 1.5 seconds.

The current pulse on conductor 234 flows into the base electrode of transistor 244 via conductor 237. Since the emitter electrode of transistor 244 is at ground voltage, the collector current of transistor 244 produces a base drive current to turn on transistor 247. The collector current of transistor 247 draws a base current out of the base electrode of transistor 252, thereby saturating transistor 252. The collector current of transistor 252 charges conductor 259 to the voltage on conductor 221 minus the saturation voltage of transistor 252, thereby providing a maximum level of supply voltage to power oscillator circuit 113.

With maximum voltage applied to conductor 259, the grounded base oscillator immediately and reliably begins oscillation, producing RF energy which is transferred from the oscillator circuit via coaxial cable 298 to sealer assembly 214. Capacitor 303 and inductor 205 form an impedance matching network which performs the function of matching the impedance associated with the repositioning of jaws 18 and 20 and the tubing therebetween to a 50 ohm characteristic impedance of 8 ft. coaxial cable 298. Neon lamp 310 is turned on by the electric field in the vicinity of conductor 66 which electric field is confined within the sealer housing by a metal shield.

In order to understand operation of the circuitry which regulates the power output of oscillator circuitry 213, it is helpful to assume that additional parasitic capacitance (designated by reference numeral 312) due to the operator's hand is added in parallel with the capacitance associated with jaws 18 and 20. This reduces the impedance presented by the jaws to the impedance matching network, resulting in an impedance mismatch between coaxial cable 298 and the impedance matching network.

Mismatching between impedance of the sealer assembly 214 and the power oscillator circuit 213 results in energy being reflected back to the power oscillator circuitry, increasing power dissipation in transistor 275. Consequently, the amount of RF energy transferred to the sealer assembly is reduced. Further, the reduced impedance results in a reduction of peak to peak voltage on conductor 295 and hence at the collector electrode of transistor 275. Due to the feedback produced by capacitors 273 and 274, reduced peak to peak voltage will appear on emitters 275c and 275d and consequently on conductor 278.

The reduced RF signal at the emitter electrode of transistor 275 is rectified and doubled by the action of diodes 267, 268, 271 and 272, and is filtered by capacitor 266. (Note that the above diodes are series connected merely to provide adequate reverse breakdown voltage protection.) The rectified and doubled voltage signal produced on conductor 246 is delayed by action of resistor 265 and capacitor 264.

Variable resistor 258, referred to as a power control potentiometer, is adjusted so that a portion of the delayed DC signal is applied to the base electrode of transistor 254. Transistor 254 functions as an emitter follower which produces an output signal on conductor 263. The signal on conductor 263 varies the bias on transistor 244, which transistor controls transistors 247 and 252 to regulate the voltage on conductor 259. More specifically, it can be seen that the reduced peak to peak signal mentioned above occurring on conductor 278 results in a reduced voltage level at node 246. This results in a reduced voltage applied to the base of emitter follower transistor 254 and a reduced voltage applied to the emitter electrode of control transistor 244. This increases the current through transistor 244, thereby increasing the current through both PNP transistors 247 and 252, thereby increasing the amount of power delivered to power oscillator circuit 213. This increases the peak to peak voltage level at the collector electrode of transistor 275, thereby correspondingly increases the RF energy delivered to the sealer assembly.

Where concern of optimizing power output is of primary importance, as might occur if the source of power were a battery(ies), the above described adjustment of resistor 258 would be controlling. However, where optimization of power output is not necessary to conserve the power input demands, the adjustment of resistor 258 described hereafter could be performed. Resistor 258 would be adjusted to establish a nominal operating bias load for transistor 254, thereby establishing the nominal operating power delivered by transistor 252 to power oscillating circuit 213. If resistor 258 is adjusted so that transistor 252 is saturated when a nominal amount of capacitance is associated with jaws 18 and 20, then transistor 252 delivers maximum power to power oscillator circuit 213 and the previously described feedback resulting from increases in parasitic capacitance 312 is ineffective.

It should be noted that the delay in the DC signal on node 246 caused by resistor 265 and capacitor 264 ensures that immediately after switch 304 is turned on, enough power will be delivered by solid state switch circuit 211 to power oscillator circuit 213 to guarantee that the common base oscillator will begin oscillation; it also ensures that an initial large burst of RF energy will be delivered to the tubing disposed between jaws 306 and 307 to initiate initial melting of the tubing. Thereafter, regulation of the delivered RF energy ensures that enough, but not too much RF energy is delivered to the tubing to enable reliable welding of the tubing despite the above mentioned variations in parasitic capacitance.

FIGS. 12–19 depict various views of three varients for automatically, and either serially or simultaneously, making a plurality of segmented sealed compartments along the blood filled tubing leading to a blood bag. These segments are ultimately used by a blood collecting facility or hospital for the purpose of typing the blood and conducting various tests on the blood. The tests may include various periodic tests to determine the fitness for use of the blood within the pertinent blood bag.

Referring specifically to FIGS. 12 and 13 there is shown a first variant 320 for advancing and sealing tubing 60 to make a predetermined number of welds 127 and form a plurality of sealed segments 322. The variant may be mounted within desk sealer 10, as illustrated; alternatively, hand-held sealer 80 (see FIG. 3) may be modified to incorporate variant 320. The variant includes a fixed idler pulley 324 rotatably mounted upon spindle 326, which spindle may extend upwardly from block 22. A drive pulley 328 is mounted upon one end of shaft 330. The shaft is journaled within a flange 332 of block 22 and the lower end supports a pinion gear 334. A stepper motor 336 includes a drive shaft 338 supporting pinion gear 340, which gear is in mesh with pinion gear 334.

Idler gears 342 and 344 are mounted upon spindles 346 and 348, respectively. These spindles extend upwardly from yoke 350. Yoke 350 is pivotally mounted upon a pivot point or pin 352. Pin 352 is disposed within desk sealer 10 such that pivotal movement of the yoke draws the idler pulleys away from pulleys 324 and 328. A solenoid 354 includes a plunger 356 attached to yoke 350 by clevis member 358. Thereby, upon retraction of plunger 356, yoke 350 is pivoted to reposition the idler pulleys away from pulleys 324 and 328.

The operation of stepper motor 336, actuation of solenoid 354 and initiation and termination of transmission of RF energy intermediate fixed jaw 18 and moveable jaw 20 is controlled by control unit 360. A thumb wheel 362, electrically connected to the control unit, is employed to set the number of segments 322 which are to be formed along the tubing. A window 364 displays a numeral commensurate with the number of segments dialed in by the thumb wheel. A miniature switch 366 is mounted to be responsive to the placement of tubing 60 within pulleys 324 and 328 adjacent fixed jaw 18. On actuation of the miniature switch, control unit 360 is energized.

The operation of variant 320 may be described as follows. On actuation of miniature switch 366, by placing tubing 60 adjacent pulleys 324 and 328, control unit 360 energizes solenoid 354 to position idler pulleys 342 and 344 adjacent pulleys 324 and 328, respectively, and maintain the tubing therebetween with sufficient friction, at least between drive pulley 328 and idler pulley 344, to translate the tubing on rotation of the drive pulley. Assuming that thumb wheel 362 has been set to display a numeral in window 364, the control unit will energize stepper motor 336 to rotate drive pulley 328 a predetermined number of revolutions. Thereafter, moveable jaw 20 is actuated to squeeze or crimp tubing 60 between it and fixed jaw 18 and RF energy will be transmitted therebetween to make a weld, as described in great detail above. On completion of seal 127, the movable jaw will retract, which retraction may be sensed by control unit 360 and stepper motor 336 is reenergized to rotate pulley 328 to draw a predetermined length of tubing 60 past the jaws and thereby form a further segment 322.

After the predetermined number of segments have been formed, a control signal is generated by control unit 360 to deactivate solenoid 354. Such deactivation results in retraction of plunger 356 and repositioning of idler pulleys 342 and 344. After such repositioning, tubing 60 may be removed.

FIGS. 14, 15 and 16 illustrates variant 370 for making a plurality of consecutive sealed segments 322. Pulley 372 includes a groove 374 interrupted by a lobe 376 extending to the perimeter of the pulley. The pulley is rotatably mounted upon a fixed spindle 378. The components comprising pulley 372 and spindle 378 are preferably of electrically conductive material. To minimize the possibility of arcing intermediate the pulley and the spindle, a conductive lubricant is deposited therebetween. Pulley 380 is of dielectric material and includes a groove 382. An insert 384 of electrically conductive material is disposed interior of the pulley and includes a tab 386 extending radially to a point generally commensurate with the perimeter of the pulley. The dielectric material envelopes tab 386 except for end face 388 and defines a lobe 390 in groove 382. Pulley 380 is mounted upon spindle 392, which spindle is of electrically nonconductive material.

As particularly illustrated in FIG. 16, there is shown a representative embodiment for maintaining pulleys 372 and 380 in mesh with one another through drive gear 394 and idler gear 396. It is to be understood that the teeth disposed upon pulleys 322 and 380 may be formed as part of the pulleys themselves or axially displaced therefrom, depending upon various engineering and practical considerations. By this arrangement, it becomes evident that both pulleys will rotate together with one another which rotation, due to engagement of tubing 60 within the respective grooves, translates the tubing therepast. When lobes 376 and 390 become located opposite one another, tubing 60 is squeezed therebetween. Upon energization of circuitry for transmitting RF energy intermediate tab 386 and pulley 372, a weld 127 is developed in the tubing, as described in detail above. Energization of the circuitry may be initiated by the pulleys, gears or other mechanical elements which can trigger a miniature switch or the like at the appropriate moment.

To engage and disengage tubing 60 intermediate the pulleys, a solenoid 398 may be employed. Plunger 400 is operatively connected to an arm 402 pivotally mounted commensurate with the spindle for idler gear 396. The other end of arm 402 is in operative engagement with spindle 392 supporting pulley 380. Thereby, extension of plunger 400 results in pivotal movement of arm 402, which movement displaces pulley 380 from pulley 372 in the direction indicated by arrow 404 to permit insertion and removal of tubing 60 intermediate the pulleys. The control unit for operation of the solenoid, as well as drive gear 394 may be the same as or equivalent to that illustrated in FIG. 12.

There are several means by which RF energy may be conveyed to tab 386 to effect welding of tubing 60 to make a seal 127. In the embodiment illustrated in FIG. 15, RF energy from a source 406, which source may be that described with respect to FIG. 2, is conveyed through conductor 408 to an electrically conducting circular plate 410 disposed at the bottom of pulley 380. A plate 412 is disposed intermediate plate of dielectric material 410 and electrically conductive plate 414 electrically connected to insert 384. Thereby, the RF energy is capacitively coupled intermediate plate 410 and insert 384. By such coupling, the problems attendant arcing are avoided.

The RF energy is transmitted through insert 384 to tab 386, which tab, when lobes 376 and 390 are opposite one another, transmits the RF energy to pulley 372. This pulley is electrically conductive and provides a ground return path through spindle 378. Electrically conductive lubricant is disposed intermediate the pulley and the spindle to prevent arcing.

The control unit regulating the rotation of the respective pulleys also includes means for regulating the RF energy coincident with lobes 376 and 390 being positioned opposite one another. As described above, the physical proximity of the lobes to one another results in a squeezing of tubing 60, as illustrated in FIG. 14. Such squeezing, in combination with the transmission of the RF energy therebetween results in the production of a weld or seal across the tubing. By appropriate inputs to the control unit, the number of cycles can be readily controlled to produce a selected number of plurality of sealed segments of tubing 60 attendant each blood collection bag.

It is to be understood that the desk sealer or hand sealer described above may be modified to incorporate variant 370.

Referring to FIGS. 17, 18 and 19, there is shown a variant 420 for producing a plurality of sealed segments in tubing 60 leading to a filled blood collection bag. Herein, the moveable jaw, identified by numeral 20 in FIG. 2, is replaced by an extended moveable jaw 422 electrically and mechanically supported by a pair of shafts 423 and 424. The fixed jaw, identified by numeral 18 in FIG. 2, is replaced by a cylinder 426 having a spiral groove 427 disposed therein. The cylinder is supported by a shaft 428 or the like. The diameter of cylinder 426, as represented by spiral groove 427, is selected such that a single wrap of tubing 60 thereabout is commensurate with the length of a sealed segment to be obtained in the tubing. As particularly illustrated in FIG. 17, the ridges defining groove 427 are indented by indents 430 to a depth approximately commensurate with the depth of the groove itself. All of these indents are aligned with one another along an axis parallel to the longitudinal axis of cylinder 426.

As particularly illustrated in FIG. 19, the shape and width of indent 430 is approximately commensurate with the apex of jaw 422. On movement of jaw 422 toward cylinder 426, each of the sections of tubing 60 will be squeezed therebetween and upon such squeezing, as described in detail above, RF energy is transmitted intermediate jaw 422 and cylinder 426 to effect a weld across each of the squeezed parts of the tubing. It therefore becomes evident that a plurality of welds are simultaneously formed within tubing 60 to define and seal a plurality of interconnected segments of the tubing.

In operation, the tubing leading to the collection bag is wrapped about cylinder 426 within spiral groove 427. On fill of the collection bag, the sealer, whether variant 420 is incorporated in the desk mounted sealer or the hand held sealer, is actuated to bring jaw 422 into physical proximity with cylinder 426. Upon such repositioning, RF energy is generated to effect a weld across each part of the tubing squeezed by the movable jaw. On completion of the welds, tubing 60 is unwrapped from about cylinder 426 and it will contain a plurality of sealed segments filled with blood.

To aid in wrapping tubing 60 about cylinder 426, the cylinder may be rotatable manually or by electric drive means. As the modifications for manually or automatically rotating the cylinder are well known to those skilled in the art, details thereof will not be illustrated or described with any degree of specificity. It is to be further understood that the necessary physical and electrical modifications of the sealer, whether desk mounted or hand held, are readily and easily effected.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. Apparatus for forming a plurality of sealed segments in a length of tubing containing a fluid, said apparatus comprising in combination:
   (a) means for sealing the tubing with each of a plurality of welds to define the segments, said sealing means including:
      i. jaw means for compressing the tubing commensurate with the formation of a weld; and
      ii. transmission means for transmitting RF energy intermediate said jaw means to melt the compressed tubing and form the weld;
   (b) means for supporting and locating the tubing in relation to said jaw means to form a plurality of welds spaced along the tubing and define a plurality of the segments, said supporting and locating means comprising an element and a spiral groove disposed in and circumscribing said element for receiving and supporting multiple wraps of the tubing, said element including an indent extending across said groove in general parallel alignment with the axis of rotation of said groove and said jaw means comprising a jaw extending across and displaceable into said indent of said groove for compressively contacting the tubing disposed within said groove.

2. The apparatus as set forth in claim 1 wherein each wrap of tubing defines the length of the segment to be sealed and wherein said jaw means extends across each of the wraps to make a simultaneous weld in each of the wraps upon actuation and energization of said jaw means.

* * * * *